United States Patent
Rotondo et al.

(10) Patent No.: US 8,662,413 B2
(45) Date of Patent: Mar. 4, 2014

(54) PORTABLE COOLING DEVICE

(76) Inventors: Thomas R. Rotondo, Bloomingburg, NY (US); Christine M. Rotondo, Bloomingburg, NY (US)

( * ) Notice: Subject to any disclaimer, the term of this patent is extended or adjusted under 35 U.S.C. 154(b) by 406 days.

(21) Appl. No.: 12/692,926

(22) Filed: Jan. 25, 2010

(65) Prior Publication Data
US 2011/0180625 A1 Jul. 28, 2011

(51) Int. Cl.
*B05B 9/08* (2006.01)

(52) U.S. Cl.
USPC ........... 239/152; 239/333; 239/351; 239/358; 239/360; 285/133.11

(58) Field of Classification Search
USPC ......... 239/152, 330–333, 351, 356–360, 565; 185/5; 285/5, 23, 27, 133.5, 133.11
See application file for complete search history.

(56) References Cited

U.S. PATENT DOCUMENTS

| | | | |
|---|---|---|---|
| 1,555,467 A * | 9/1925 | Graham | 137/585 |
| 3,050,801 A * | 8/1962 | Downey | 285/244 |
| 3,633,826 A * | 1/1972 | Baker | 239/229 |
| 5,273,214 A | 12/1993 | Huffstutler | |
| 5,330,104 A | 7/1994 | Marcus | |
| 5,335,853 A | 8/1994 | Wirz | |
| 5,775,590 A * | 7/1998 | Utter | 239/152 |
| 6,095,434 A | 8/2000 | Montenegro | |
| 6,158,669 A * | 12/2000 | Louis | 239/146 |
| 6,189,805 B1 | 2/2001 | West et al. | |
| 6,439,389 B1 * | 8/2002 | Mogil | 206/579 |
| 6,651,907 B2 | 11/2003 | Rodd | |
| 6,981,613 B1 * | 1/2006 | Kamisugi | 222/105 |
| 7,347,386 B2 * | 3/2008 | Chen | 239/328 |

* cited by examiner

*Primary Examiner* — Jason Boeckmann
(74) *Attorney, Agent, or Firm* — Law Offices of Michael L. Wise, LLC

(57) ABSTRACT

An apparatus for providing cooling to a user comprises a bag, an input hose, an output hose, one or more discharge extensions, and a pump. The bag is operative to store a liquid. The one or more discharge extensions are in fluidic communication with the output hose, and each of the one or more discharge extensions terminates in a respective one of one or more nozzles. Lastly, the pump is operative to draw the liquid from the bag via the input hose and to expel the liquid into the output hose so as to cause the liquid to flow to the one or more discharge extensions and to be expelled through the one or more nozzles in the form of a water mist.

16 Claims, 4 Drawing Sheets

PORTABLE COOLING DEVICE

FIELD OF THE INVENTION

The present invention relates generally to devices for cooling, and, more particularly, to devices operative to cool a user by forcing water through nozzles to form a water mist.

BACKGROUND OF THE INVENTION

People often find it desirable to participate in outdoor activities in hot weather. Such activities may include beachcombing, walking, jogging, sailing, biking, picnicking, attending an amusement park, watching sporting events, as well as a myriad of other pursuits. Nevertheless, when the ambient air is hot, these activities may be, at the least, uncomfortable, and, at worst, capable of causing adverse medical conditions such as dehydration and heat stroke.

Devices that act to deposit a mist of water on a user for the purpose of cooling the user rely on the fact that the evaporation of water is an endothermic process, meaning that it absorbs energy in the form heat. Accordingly, when small droplets of water are deposited on a user's skin and begin to evaporate, the user's skin is cooled. Converting the water to a fine spray by misting (i.e., atomization) helps to better coat the user's skin, adding to the effectiveness of this cooling effect.

There have been several attempts to produce portable misting devices for cooling. Information relevant to attempts can be found in, for example, U.S. Pat. No. 5,775,590 to Utter, U.S. Pat. No. 6,095,434 to Montenegro, and U.S. Pat. No. 6,189,805 to West et al (none of which are admitted as prior art by their inclusion herein). However, the devices described in the first two references require the user to manually pump the devices in order to produce a water mist. The user must, therefore, exert additional physical energy in the hot ambient in order to obtain any benefit from these devices. In contrast, the last reference utilizes a pump that pressurizes a tank of water above atmospheric pressure (e.g., 3 atmospheres) in order to force the water through downstream nozzles. Unfortunately, such a method for producing a water mist requires a robust, leak-proof tank in order to withstand the high pressures produced by the pump. Moreover, because of the danger of explosion, the condition of the tank and its pressurization must be carefully monitored.

For the foregoing reasons, there is a need for portable misting devices that address the above-described deficiencies.

SUMMARY OF THE INVENTION

Embodiments of the present invention address the above-identified needs by teaching novel cooling devices that are portable, safe, reliable, self-automated, and have multiple, individually-orientable discharges.

In accordance with an aspect of the invention, an apparatus for providing cooling to a user comprises a bag, an input hose, an output hose, one or more discharge extensions, and a pump. The bag is operative to store a liquid. The one or more discharge extensions are in fluidic communication with the output hose, and each of the one or more discharge extensions terminates in a respective one of one or more nozzles. Lastly, the pump is operative to draw the liquid from the bag via the input hose and to expel the liquid into the output hose so as to cause the liquid to flow to the one or more discharge extensions and to be expelled through the one or more nozzles in the form of a water mist.

In accordance with one of the above-identified embodiments of the invention, an apparatus comprises a bag, an input hose, a pump, and an output hose. The outlet hose, in turn, comprises a plurality of discharge extensions that each terminate in a respective nozzle. The bag is adapted to hold a liquid such as water, but is also manually collapsible when not in use. In operation, the pump draws the liquid from the bag via the input hose and expels the liquid into the output hose so as to cause a flow of the liquid in the output hose. This flow of liquid, in turn, travels to and through the discharge extensions, where it is expelled through the nozzles in the form of a water mist. Each discharge extension is individually orientable with respect to the output hose. Moreover, clips on the output hose allow it to be mounted to an external structure.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
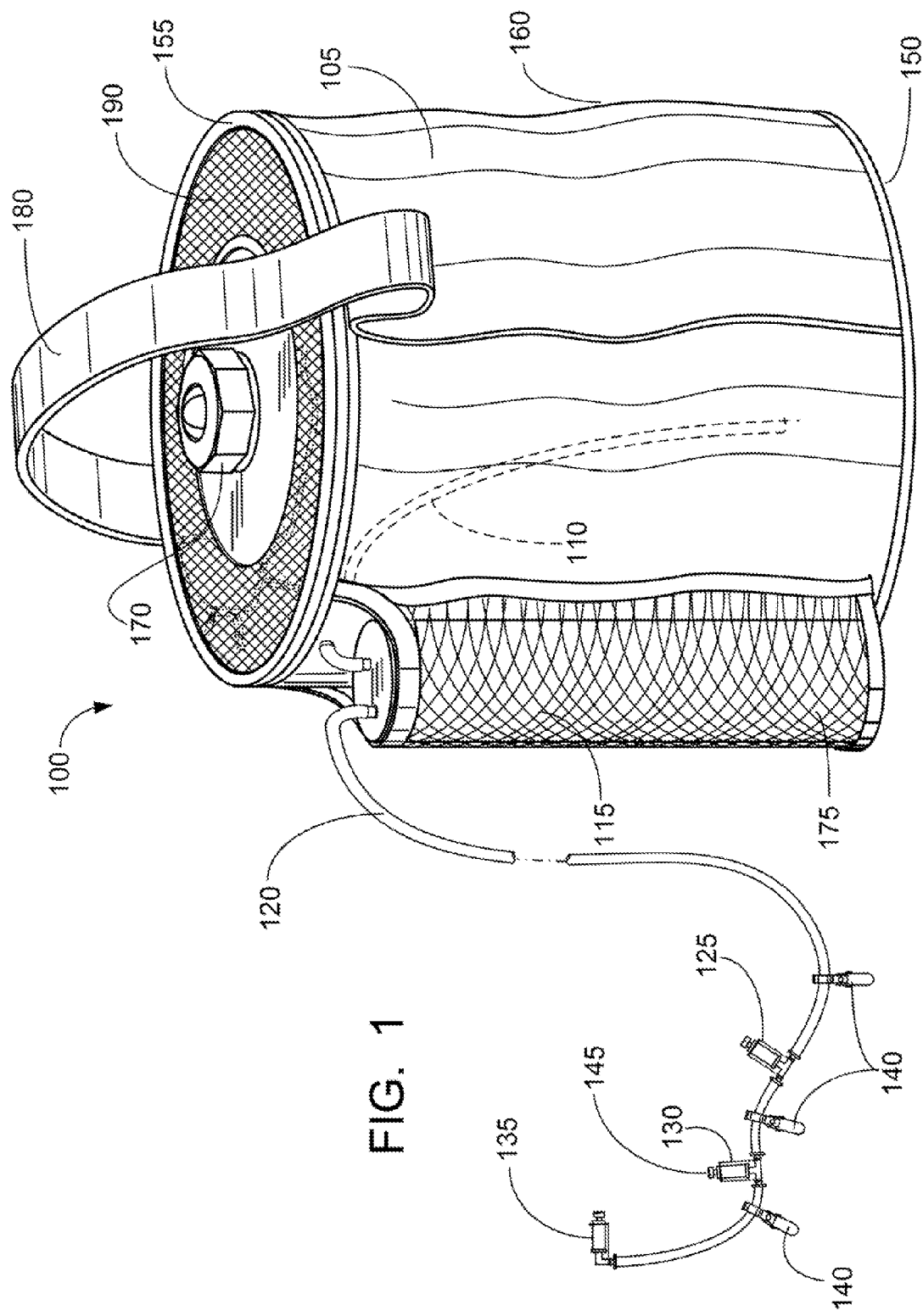
FIG. 1 shows a front perspective view of an apparatus in accordance with an illustrative embodiment of the invention.
Figure 2:
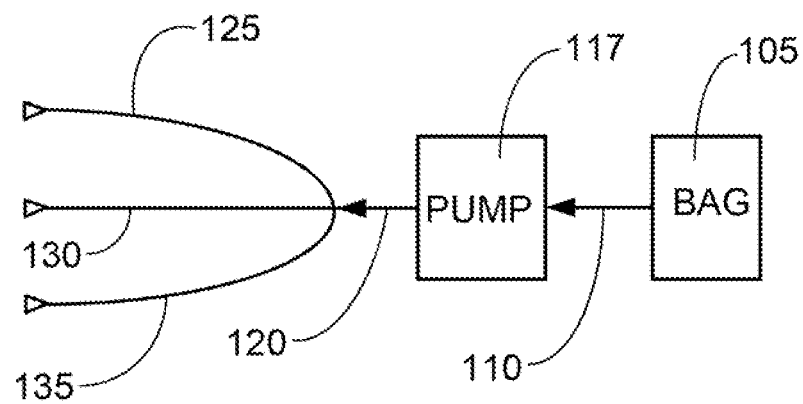
FIG. 2 shows a schematic diagram of the FIG. 1 apparatus.

FIG. 1 shows a front perspective view of an apparatus 100 in accordance with an illustrative embodiment of the invention, while FIG. 2 shows a schematic diagram of the same apparatus. The apparatus comprises a bag 105, an input hose 110, a pump housing 115 (containing a pump 117), an output hose 120, three discharge extensions 125, 130, 135, and several clips 140. Each of the three discharge extensions terminates in a respective nozzle 145.

In order to operate the apparatus 100, the user simply fills the bag 105 with a liquid such as water and activates the pump 117. The pump, in turn, draws the liquid from the bag via the input hose 110 and expels the liquid into the output hose 120 so as to cause a flow of the liquid in the output hose. This flow of liquid travels to and through the discharge extensions 125, 130, 135, where it is eventually expelled through the nozzles 145 in the form of a water mist. The user may then direct the water mist as needed to provide cooling.

Additional aspects of the bag 105 can be seen by again referring to FIG. 1. The bag itself comprises a bottom 150, a lid 155, and a sidewall 160 that collectively form a substantially cylindrical shape about a liquid storage space 165. The bottom, lid, and sidewall are preferably formed of one or more flexible materials, such as, but not limited to, polyester and nylon coated in polyvinylchloride, thereby allowing the bag to be manually collapsed when not in use. Filling and emptying the liquid storage space is facilitated by a screw-on cap 170 built into the lid. The bag also includes an external pocket 175 that is formed of an elastic netting material for holding the pump housing 115 proximate to the bag. For ease of carrying, the bag is also fitted with a carrying strap 180.

Figure 3:
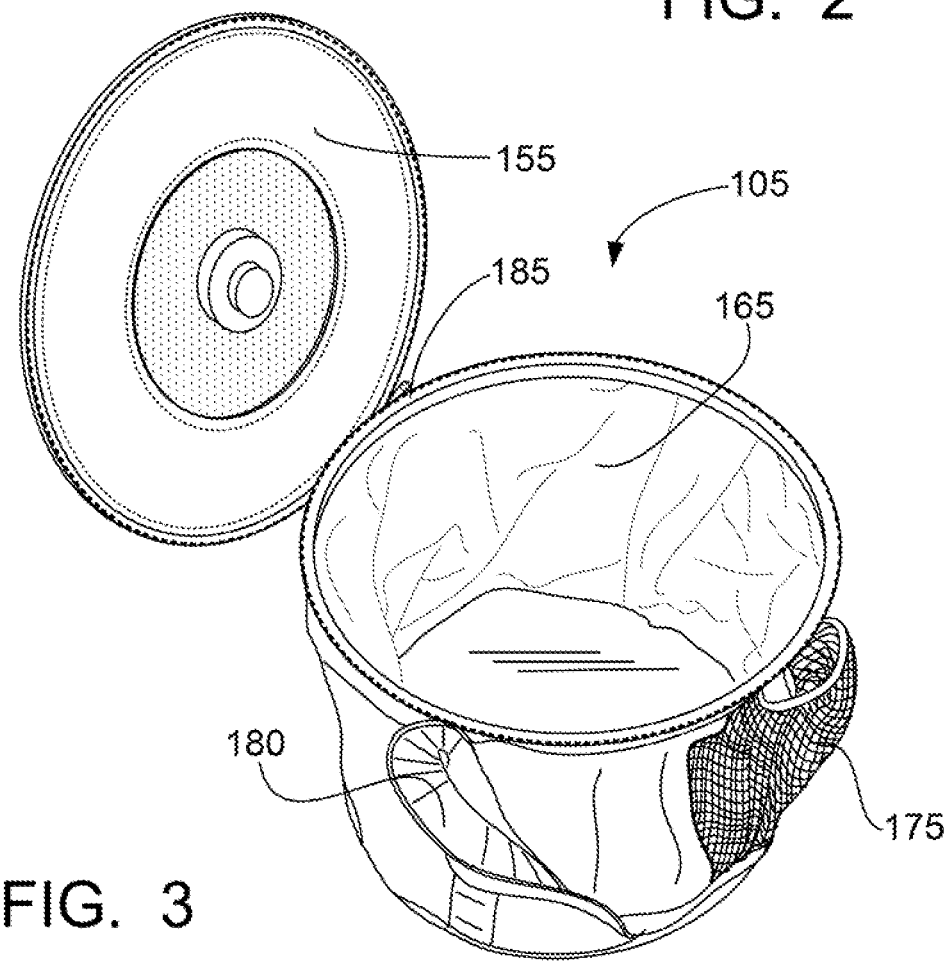
FIG. 3 shows a top perspective view of the bag in the FIG. 1 apparatus with its lid open.
Figures 4, 5:
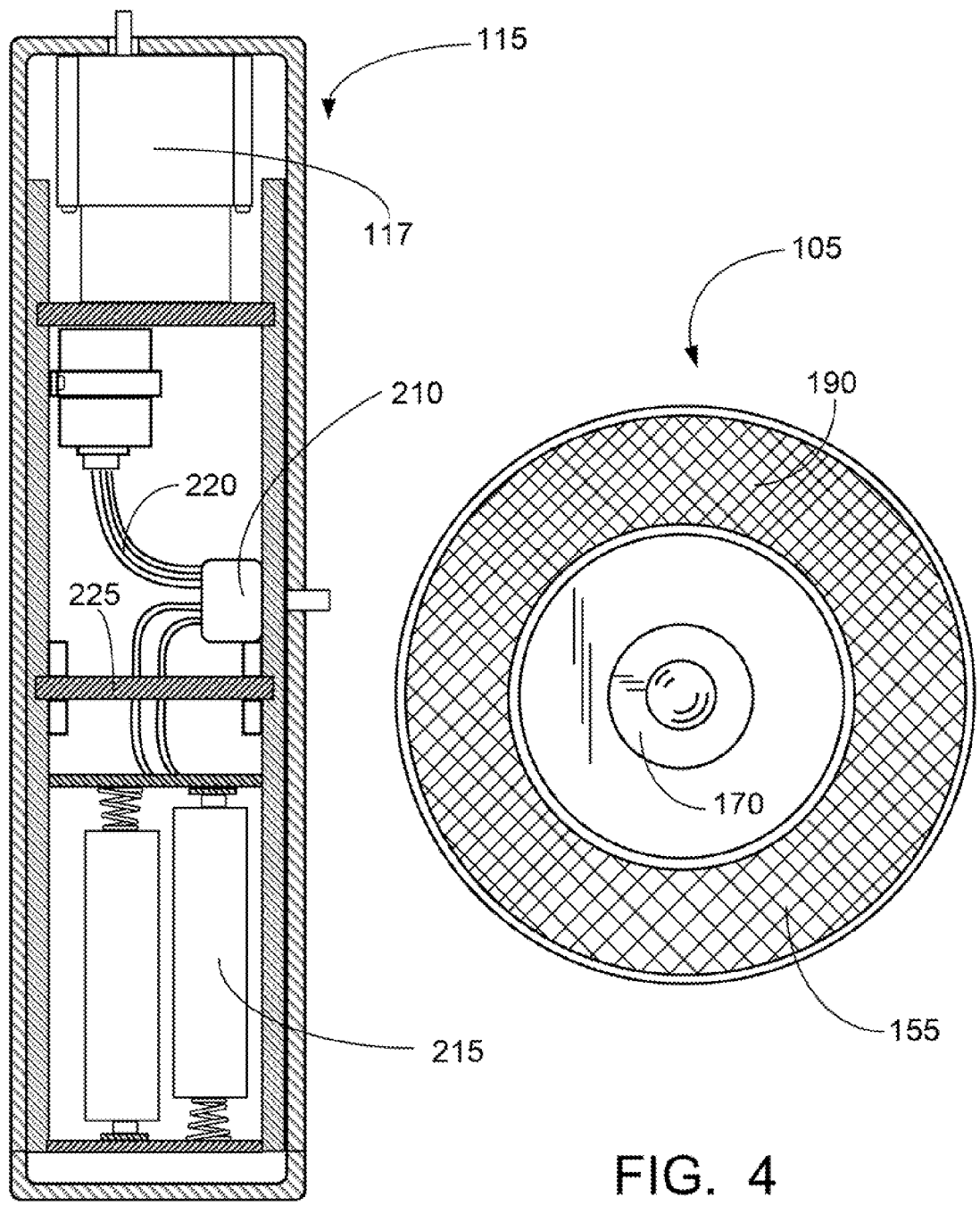
FIG. 4 shows a top elevation view of the bag in the FIG. 1 apparatus.
FIG. 5 shows a front elevation view of the pump housing in the FIG. 1 apparatus with the housing cut away.

Even more aspects of the bag 105 can be seen in FIGS. 3 and 4. In accordance with aspects of the invention, the lid 155 of the bag is adapted to be at least partially manually detached from the sidewall 160 so as to expose the liquid storage space 165. FIG. 3 shows a top perspective view of the bag with its lid open in this manner. Allowing the lid to be detached in this way allows the liquid storage space to be easily dried as well as cleaned. In the present embodiment, the ability to at least partially detach the lid is accomplished with a zipper 185, although several other attachment means are contemplated (e.g., a screw-on or snap-on lid).

In addition, as indicated in both FIG. 1 and a top elevation view of the lid 155 shown in FIG. 4, the lid further comprises a ring-shaped portion of elastic netting 190. This ring-shaped netting is provided to create a convenient means of the storing the output hose 120 and the discharge extensions 125, 130, 135. The output hose and discharge extensions may, for example, be coiled and inserted under this ring-shaped netting when the apparatus 100 is not in use. In addition, the ring-shaped netting may also be utilized to store a spare output-hose/discharge-extension combination.

In terms of composition, both the input and output hoses 110, 120 may comprise conventional flexible tubing. They may, for example, be formed of polyvinylchloride, polyurethane, nylon, polyethylene, or any one of several other conventional compounds for forming tubing. Hose dimensions may be 1/8 inch (inner diameter) or any other suitable size.

Figure 6:
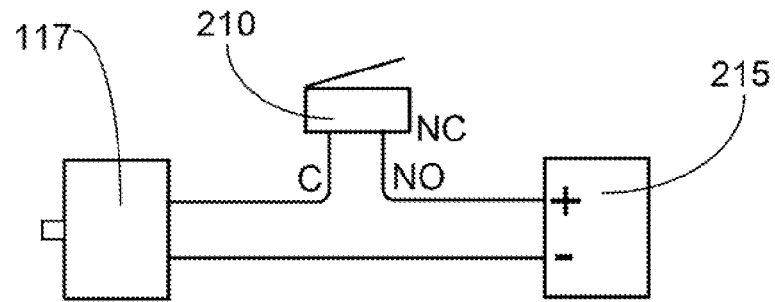
FIG. 6 shows an electrical schematic of the FIG. 1 pump, switch, and batteries.

FIGS. 5 and 6 go on to show aspects of the pump housing 115 and its constituent components. More particularly, FIG. 5 shows a front elevation view of the pump housing with the pump housing cut away to reveal its internal components, while FIG. 6 shows an electrical schematic of these components. In the present embodiment, the pump housing is substantially cylindrical in shape, which allows it to be readily inserted into and removed from the external pocket 175 on the bag 105. The pump housing, in turn, houses the pump 117, a manually operable switch 210, several batteries 215, wiring 220, and internal supports 225. As indicated in the schematic, the switch sits between the pump and the batteries and is adapted to turn on and turn off the pump.

The pump 117 itself is preferably a gear pump, although any other suitable pump capable of pumping the liquid may be utilized. Gear pumps utilize the meshing of gears to pump fluid by displacement. As the gears rotate they separate on the intake side of the pump, creating a void and suction which is filled by the liquid in the input hose 110. The liquid is carried by the gears to the discharge side of the pump, where the meshing of the gears displaces the liquid into the output hose 120. A suitable gear pump for the present application may be, for example, a TOPSFLO TG-06 DC Micro Gear Pump from TOPS Micro Pump & Motor Technology Co., Ltd. of Zhejiang, China. This pump can operate on six volts, which means it can be conveniently powered by four conventional AA-type 1.5 volt battery cells arranged in series. The switch 210 may be, as just one example, a push button, single-pole-double-throw (SPDT) switch such as the Snap Acting Momentary Pushbutton Switch 8125 from C&K Components, Inc. of Watertown, Mass., USA. Nevertheless, like the pump, any alternative switch may be utilized and the resulting apparatus would still come within the scope of the invention.

Optionally, the batteries 215 may be rechargeable and the pump housing 115 may be fitted with those circuit elements required to recharge the batteries. The pump housing may, for example, comprise a receptacle for receiving a direct current (DC) voltage from a conventional alternating current (AC) wall plug adaptor for this purpose. Moreover, the pump housing may also be fitted with those circuit elements required to automatically turn the pump off after the pump runs for a predetermined period of time (i.e., an electronic timer). Both battery chargers and electronic timers are features regularly found in conventional consumer electronics and, as a result, their implementation will be familiar to one skilled in the art.

Figure 7:
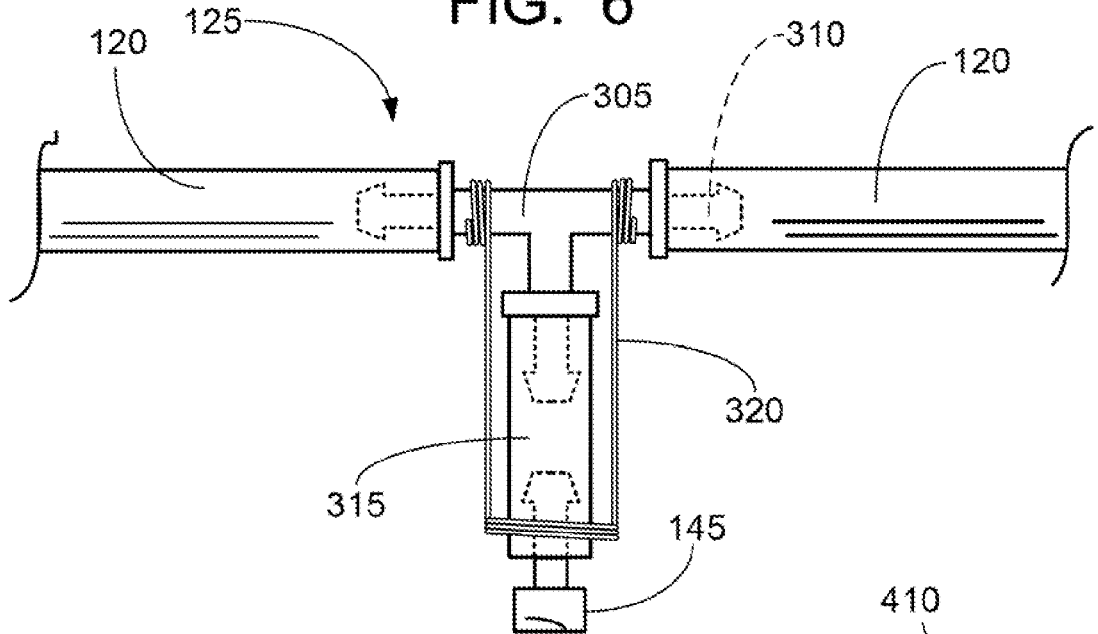
FIG. 7 shows a front elevation view of a discharge extension in the FIG. 1 apparatus.

Continuing, FIG. 7 shows a front elevation view of the discharge extension 125 in the apparatus 100. The discharge extension comprises a tee fitting 305 with hose barbs 310 that is teed into the output hose 120. This tee fitting, in turn, directs the liquid provided by the pump 117 into an extension tube 315, which terminates in the nozzle 145. The nozzle may be, for example, a Barb Series brass nozzle for fine atomization from AmFog Nozzle Technologies Inc. of Scottsdale, Ariz., USA. Like the input and output hoses 110, 120, the extension tube is preferably formed of a flexible material, allowing the nozzle to be independently oriented relative to the tee fitting and, consequently, the output hose. A portion of wire 320 (i.e., a positioning wire) loops around the tee fitting and the extension tube as indicated in the figure and thereby acts to support the extension tube in a particular orientation. The wire may, for example, comprise aluminum. In this way, the end of each discharge extension can be pointed by the user in a particular direction relative to the output hose and the portion of wire will act to maintain that orientation. In other words, an end portion of each discharge extension is individually orientable by the user relative to the output hose.

In the present embodiment, the apparatus 100 is fitted with three discharge extensions 125, 130, 135, but this number is merely illustrative and more or fewer discharge extensions may be utilized in actual practice. Notably, a discharge extension that terminates the output hose 120 (like the discharge extension 135) differs from those that merely interrupt the output hose (like the discharge extensions 125, 130) in that the terminating discharge extension utilizes an elbow fitting rather than a tee fitting 305.

Figure 8:
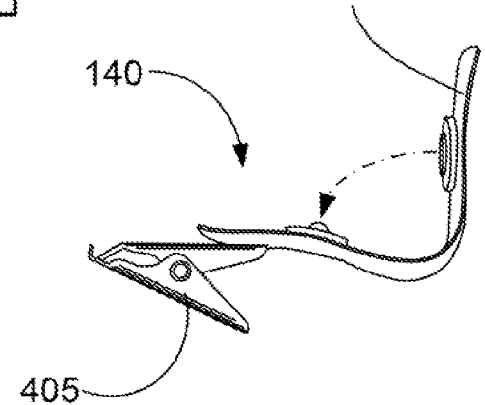
FIG. 8 shows a front perspective view of a clip in the FIG. 1 apparatus.

Lastly, FIG. 8 shows a front perspective view of one of the clips 140 in the apparatus 100. The clips allow the output hose to be temporarily attached to an external structure (e.g., beach umbrella, lawn chair, rim of hat) while the apparatus is in use. In the present embodiment, the clips comprise conventional clips like those used to hold name tags. More specifically, a clip comprises a spring-loaded grasping portion 405 as well as a strap 410 for looping around the output hose 120.

In closing, it should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus for providing cooling to a user, the apparatus comprising:
   a bag, the bag operative to store a liquid;
   an input hose, the input hose at least partially disposed within the bag;
   a pump, the pump connected to the input hose;
   a first output hose portion, the first output hose portion connected to the pump;
   a tee fitting, a first connection of the tee fitting connected to the first output hose portion;
   an extension tube, the extension tube connected to a second connection of the tee fitting and comprising a flexible tube;
   a nozzle, the nozzle disposed at an end of the extension tube and operative to form a liquid mist when supplied with the liquid;
   a second output hose portion, the second output hose portion connected to a third connection of the tee fitting; and
   a positioning wire, a first portion of the positioning wire encircling a part of the tee fitting, a second portion of the positioning wire encircling a part of the nozzle, and a third portion of the positioning wire spanning between the first portion and the second portion and manually bendable so as to allow the user to set an orientation of the nozzle relative to the tee fitting;
   wherein the pump is operative to draw the liquid from the bag via the input hose and to expel the liquid into the first output hose portion; wherein the extension tube is located between the tee fitting and the nozzle.

2. The apparatus of claim 1, wherein the bag comprises a bottom, one or more sidewalls attached to the bottom, and a lid attached to the one or more sidewalls, wherein the bottom, the one or more sidewalls, and the lid collectively define a liquid storage space.

3. The apparatus of claim 2, wherein the lid is adapted to be manually at least partially detached from the one or more sidewalls so as to expose the liquid storage space.

4. The apparatus of claim 2, wherein the lid comprises a screw-on cap that gives access through the lid to the liquid storage space.

5. The apparatus of claim 2, further comprising a ring-shaped portion of elastic netting that is attached to the lid.

6. The apparatus of claim 1, wherein the bag is substantially cylindrical in shape.

7. The apparatus of claim 1, wherein the bag is manually collapsible.

8. The apparatus of claim 1, wherein the bag comprises an external pocket adapted to support the pump proximate to the bag.

9. The apparatus of claim 8, wherein the external pocket comprises a portion of elastic netting.

10. The apparatus of claim 1, wherein the bag comprises a carrying handle.

11. The apparatus of claim 1, wherein the pump is disposed in a pump housing, the pump housing being substantially cylindrical in shape.

12. The apparatus of claim 1, wherein the pump comprises a gear pump.

13. The apparatus of claim 1, wherein the pump is powered by one or more batteries.

14. The apparatus of claim 1, wherein the pump is controlled by one or more manually operable electrical switches.

15. The apparatus of claim 1, further comprising a clip attached to the first output hose portion or the second output hose portion and operative to mount the first output hose portion or the second output hose portion to an external object.

16. The apparatus of claim 1, wherein a fourth portion of the positioning wire encircles a part of the tee fitting separate from the part of the tee fitting encircled by the first portion of the positioning wire.

* * * * *